(12) United States Patent
Kang et al.

(10) Patent No.: US 6,712,602 B2
(45) Date of Patent: Mar. 30, 2004

(54) HYBRID TYPE HIGH PRESSURE COMBUSTION BURNER EMPLOYING CATALYST AND CST COMBUSTION WITH STAGED MIXING SYSTEM

(75) Inventors: Sung-Kyu Kang, Daejeon (KR); Nam-Jo Joung, Daejeon (KR); Yong-Seok Seo, Daejeon (KR); Sung-Jun Cho, Daejeon (KR); In-Soo You, Daejeon (KR); Hyun-Dong Shin, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 62 days.

(21) Appl. No.: 10/210,159

(22) Filed: Aug. 1, 2002

(65) Prior Publication Data

US 2003/0186181 A1 Oct. 2, 2003

(30) Foreign Application Priority Data

Apr. 2, 2002 (KR) ........................ 2002-17925

(51) Int. Cl.[7] .............................. F23D 3/40; F23D 14/00
(52) U.S. Cl. ............................. 431/7; 431/170; 431/268
(58) Field of Search ................................ 431/3, 7, 8, 9, 431/10, 170, 328, 351, 354, 268, 326; 60/723, 274

(56) References Cited

U.S. PATENT DOCUMENTS

| 4,375,949 A | * | 3/1983 | Salooja .......................... 431/7 |
| 4,918,915 A | * | 4/1990 | Pfefferle ........................ 60/781 |
| 5,160,254 A | * | 11/1992 | Bell et al. ....................... 431/7 |
| 6,089,855 A | * | 7/2000 | Becker et al. ................... 431/9 |
| 6,302,683 B1 | * | 10/2001 | Vestin et al. .................... 431/7 |

* cited by examiner

Primary Examiner—James C. Yeung
(74) Attorney, Agent, or Firm—Cooper & Dunham LLP (57) ABSTRACT

Disclosed is a hybrid high pressure catalytic combustion burner employing catalysts and CST combustion with staged mixing systems, in which a primary combustion gas containing reacted gas of a primary gas mixture, which is formed via catalytic combustion, is subject to a secondary mixing with the primary gas mixture containing fuel and high temperature air, completing stable high temperature CST combustion at ultra lean conditions, thereby achieving high temperature combustion reducing formation of $NO_x$.

9 Claims, 12 Drawing Sheets

HYBRID TYPE HIGH PRESSURE COMBUSTION BURNER EMPLOYING CATALYST AND CST COMBUSTION WITH STAGED MIXING SYSTEM

BACKGROUND OF THE INVENTION

1. Field of the Invention

The present invention relates to a hybrid combustion burner using catalytic combustion appropriate to combustion conditions of high temperature and high pressure. More particularly, the invention relates to a hybrid high pressure combustion burner employing catalysts and CST (Catalytically Stabilized Thermal, hereafter called as "CST") combustion with staged mixing systems, in which a primary combustion gas containing reacted gas of a primary gas mixture, which is formed via catalytic combustion, is subject to a secondary mixing with the primary gas mixture containing fuel and high temperature air, completing stable high temperature CST combustion at ultra lean conditions, thereby achieving high temperature combustion reducing the formation of NOx.

2. Description of the Related Art

The ratio of $CO_2$ amounts discharged by combustion of coal, petroleum and natural gas is considered to be 10:8:6. Natural gas is the cleanest fuel and generates the least $CO_2$, among available fossil fuels. Accordingly, Natural Gas Research in the U.S. anticipates that about 50% of the world's generated energy will be provided by gas turbines within the next 20 years. As anticipated, demands for gas turbines are increasing with time.

Technologies for reducing and removing $NO_x$ can be grouped into combustion modifications and post-combustion processes. Especially, as for the post-combustion processes, SCR (Selective Catalytic Reduction) is the most commonly used. However, this has a problem of very high operation costs, due to requirement of ammonia employed as a reducing agent. On the other hand, the combustion modifications are accomplished by modifying combustion conditions or combustion systems, leading to reduction of $NO_x$ formation. Such a representative modification is a lean mix combustion technology. However, such lean combustion has a problem of producing noise, oscillation, and more carbon monoxide and unburnt hydrocarbons, which are responsible for unstable CST combustion during combustion.

These problems can be overcome by using a new technology, that is, the catalytic combustion process. Research focusing on catalytic combustion is now actively underway. Catalytic combustion enables stable complete combustion by a surface reaction of a catalyst even at ultra lean conditions, where stable combustion is hardly accomplished only by using CST combustion. Such catalytic combustion makes it possible to set a CST combustion temperature to a lower temperature at which thermal $NO_x$ is not produced. Accordingly, this is an important method to fundamentally solve the problem of nitrogen oxides formation.

Gas turbine combustors using catalytic combustion are designed to have characteristics different from general gas turbine combustors in terms of their combustion reactions. Upon considering realistic application of catalytic combustion to conventional gas turbines, there is considered not only to simple replacement of the combustors, but also design changes for other components composing the gas turbines. Specifically, in addition to combustors of gas turbines, auxiliary components such as external cases, liners with internal holes, fuel injection systems, and ignition-starting systems are also organically affected by such an application of catalytic combustion. Accordingly, given that only combustors of the conventional gas turbines are replaced based on their modular construction, multi-can type combustors are preferentially selected over annular type combustors.

The multi-can type combustors enable convenient control of catalytic combustion for reasons as described above. Also, current trends around the world prefer multi-can type catalytic combustors. In addition, much research has been directed to methods for installing modular catalytic combustors in place of the conventional combustors of the gas turbines. Such replacement of the conventional combustors of the gas turbines with combustors employing catalysts offers the following expected benefits.

First, upon using catalytic combustors, combustion efficiency is higher than conventional combustors of gas turbines at the ultra lean states. The reason is that complete surface combustion takes place on the surface of a catalyst support, unlike conventional processes such as gas flow-dependent combustion. It is expectable that such complete combustion using catalytic combustion provides much solution for satisfying high temperature operation conditions. High temperature operation conditions have been competitively developed by researchers, with the aim of enhancing thermal efficiency.

Another beneficial effect of catalytic combustion is that amounts of NOx, CO and hydrocarbon generated are reduced. Compared to general CST combustion processes, catalytic combustion occurs at a lower temperature, so the amount of $NO_x$ generated is reduced. Complete combustion also leads to a reduced amount of hydrocarbon. Such carbon residue reduction may result in decreased abrasion of turbine blades. It is known that a crucial factor determining lifetime of blades in a gas turbine is that carbon residue generated from the combustor damages the blades by collision therewith. Short lifetime of blades thus can be improved by employing catalytic combustion.

Another benefit of catalytic combustion is that hot gas from the combustor has a lower maximum temperature. As a result, cooling requirements accompanying complex structures mounted in conventional gas turbines can be reduced. Actually, upon combustion employing methane for use in operating non-catalytic combustors of gas turbines, a minimum temperature of the combustors is approximately 1000° C. This temperature is a minimum temperature capable of being obtained upon the minimum load operation, for all conventional small-sized turbines for industrial use, and most of gas turbines. On the other hand, as for the catalytic combustors, the maximum temperature of the combustor is determined based on a surface combustion temperature, equivalent ratio of gases, pressure and temperature applied in a premix system, and self-ignition temperature in a mixer of the combustor. Such maximum temperature is 1000° C. or more. Upon the subsequent CST combustion, the CST combustion temperature can be lowered to a temperature at which little thermal NOx is generated. Thus, it is possible to solve some problems of complex structures of cooling systems in the gas turbines, which might be required due to high temperature in the combustors.

Since the 1970s, in Japan, a research consortium has been organized centering around electric power companies, and research has been dominated by main three groups, that is, a first group including Osaka GAS and Toyo CCI and Kobe Steelworks Co., a second group including Tokyo Electric Power Co. and Toshiba, a third group including Central Research Institute of Electric Power and Kansai Electric Power Co. They developed a catalyst of hexaaluminate whose specific surface area is not significantly reduced even at 1400° C., exhibiting resistance to high temperature, and a CST combustor. However, such a ceramic catalyst body has a limitation in terms of thermal shock.

Meanwhile, in the U.S., catalytic combustors for use in gas turbines have been studied since the 1970s. The research has focused on metal honeycomb in which a metal sheet with good thermal shock is coated with a catalyst. Such metal honeycomb is considered to have excellent catalytic effect. For example, Catalytica Energy Inc. was successful in commercializing the first catalytic combustor employing such a catalyst material. The combustor showed performance with ultra low emissions of $NO_x$<3 ppm and CO<10 ppm. Despite its favorable properties, there are some disadvantages. Since structures of flow baffle boards are different according to the size of combustors, it is inconvenient to design catalyst bodies, and poor fundamental understanding of catalytic surface-chemistry processes limits scaling up of the combustion systems. Moreover, since unstable CST combustion with lift CST combustion is produced in a CST combustion zone, an accurate control of combustion conditions is required.

SUMMARY OF THE INVENTION

Therefore, the present invention has been made in view of the above problems associated with conventional combustors, including hot spot, unstable lift CST combustion and flashback, and it is an object of the present invention to provide a hybrid high pressure combustion burner employing catalysts and CST combustion with staged mixing systems, which is technically improved in terms of reduced NOx formation and combustor operations due to CST combustion at lower temperature.

In accordance with the present invention, the above and other objects can be accomplished by the provision of a hybrid high pressure combustion burner with staged mixing systems employing catalysts and CST combustion, comprising: a primary gas mixing portion for homogenous mixing of preheated air with fuel; a catalytic combustion portion for burning the gas mixture prepared in the primary gas mixing portion via surface combustion; a secondary gas mixing portion for mixing of gas burnt via surface combustion in the catalytic combustion portion with unburnt gas which is not subject to surface combustion; and a CST combustion portion for burning the gas mixture prepared in the secondary gas mixing portion.

Preferably, the primary gas mixing portion includes a gas burner or an electric heater for preheating air supplied from a nozzle, a fuel injection nozzle for injecting a fuel, and a primary mixer for homogenous mixing of the preheated air with the fuel.

The catalytic combustion may be achieved in catalytic layers of 4 thin sheets composed of corrugated and straight plates, the flat plate and the corrugated sheet being coated with catalysts, and the 4 sheets being wound to form a snail-shaped structure, as well as a plurality of supporters for supporting the catalytic layers, and an annular part being supported by the supporters.

It is preferable that the secondary gas mixing portion is mounted with a secondary mixer of a swirler. The CST combustion may be achieved at a horn-shaped combustion chamber called the burner tiles.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
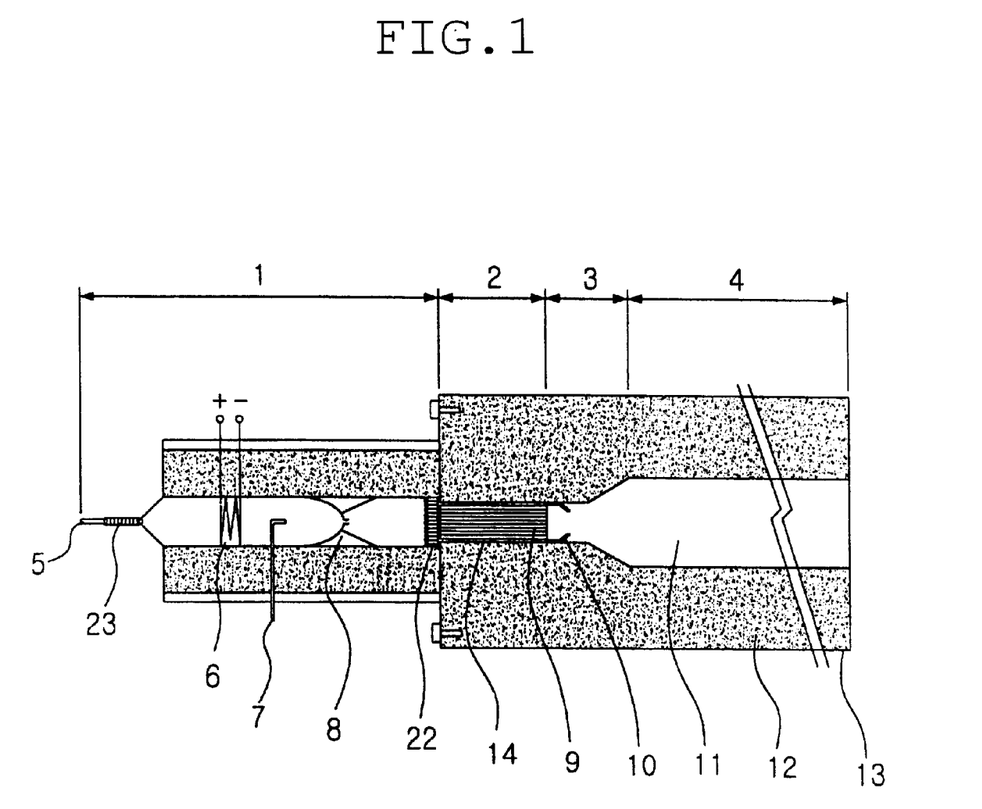
FIG. 1 is a schematic view illustrating structural components of a hybrid high pressure combustion burner with staged mixing systems employing catalysts and CST combustion, according to the invention.
Figure 2:
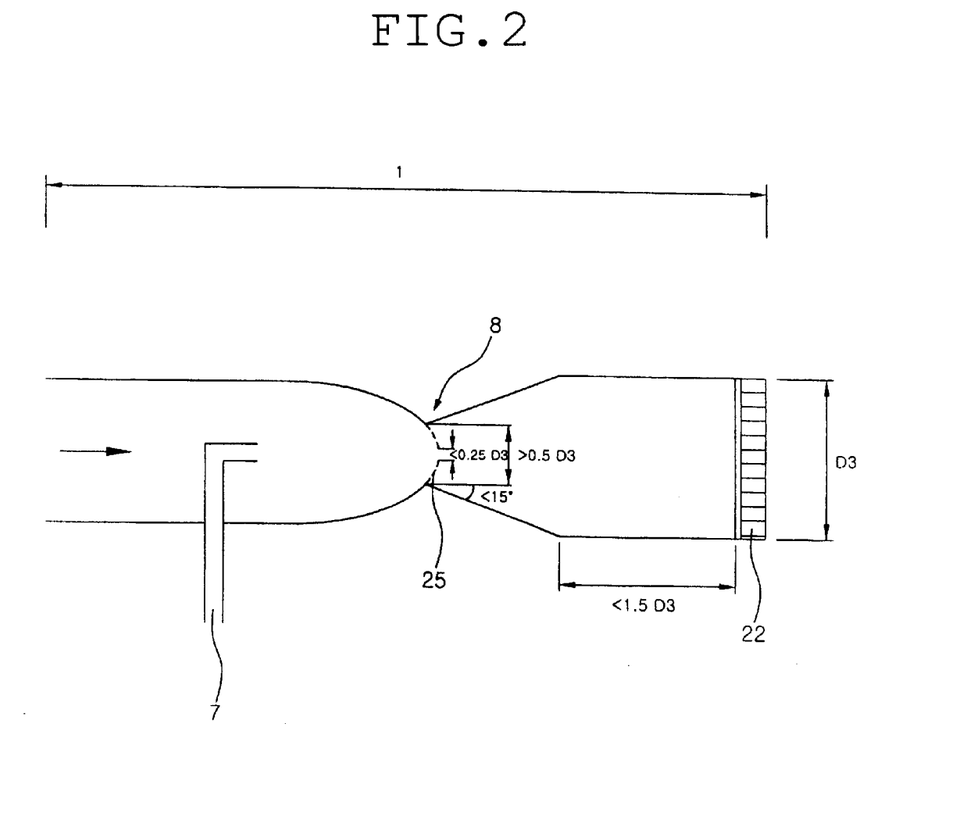
FIG. 2 is a detail drawing of a primary gas mixing portion composing a hybrid high pressure combustion burner with staged mixing systems employing catalysts and CST combustion, according to the invention.
Figure 3:
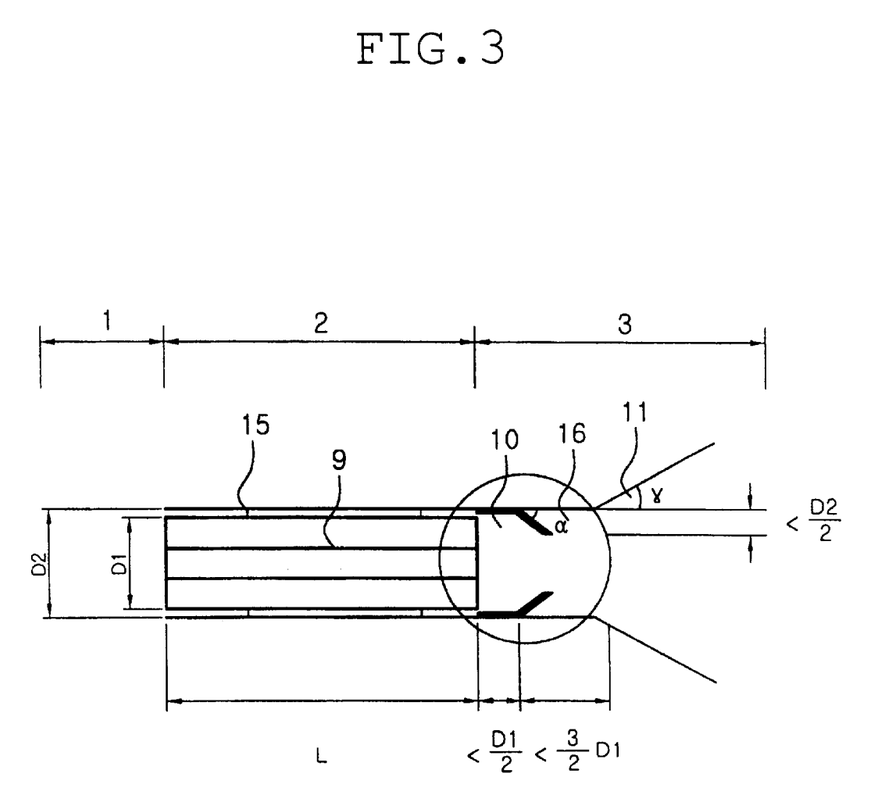
FIG. 3 is a cross-sectional detail view of a catalytic combustion portion and a secondary gas mixing portion composing a hybrid high pressure combustion burner with staged mixing systems employing catalysts and CST combustion, according to the invention.
Figure 4:
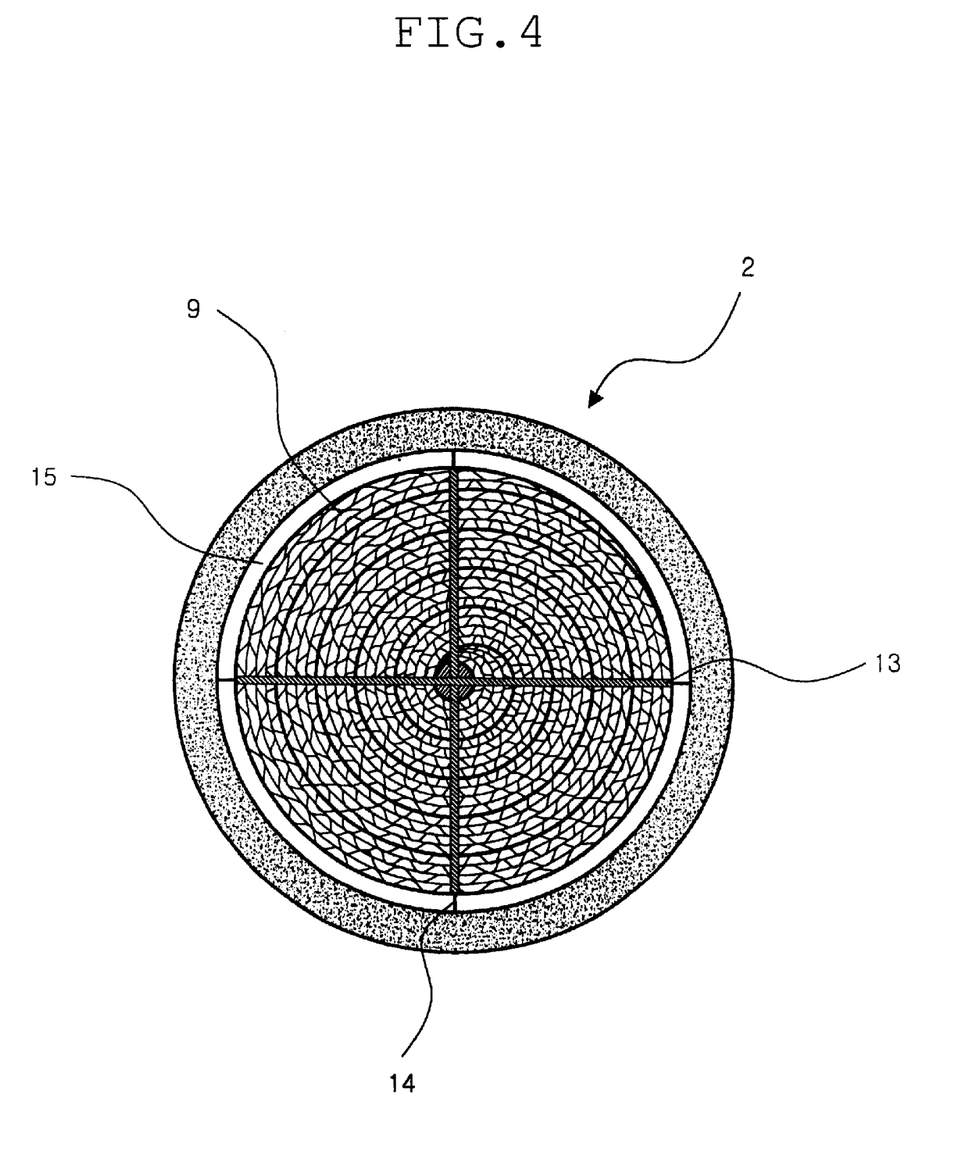
FIG. 4 is an apical cross-sectional view of a catalytic reactor parts of a hybrid high pressure combustion burner with staged mixing systems employing CST combustion, according to the invention.
Figure 5:
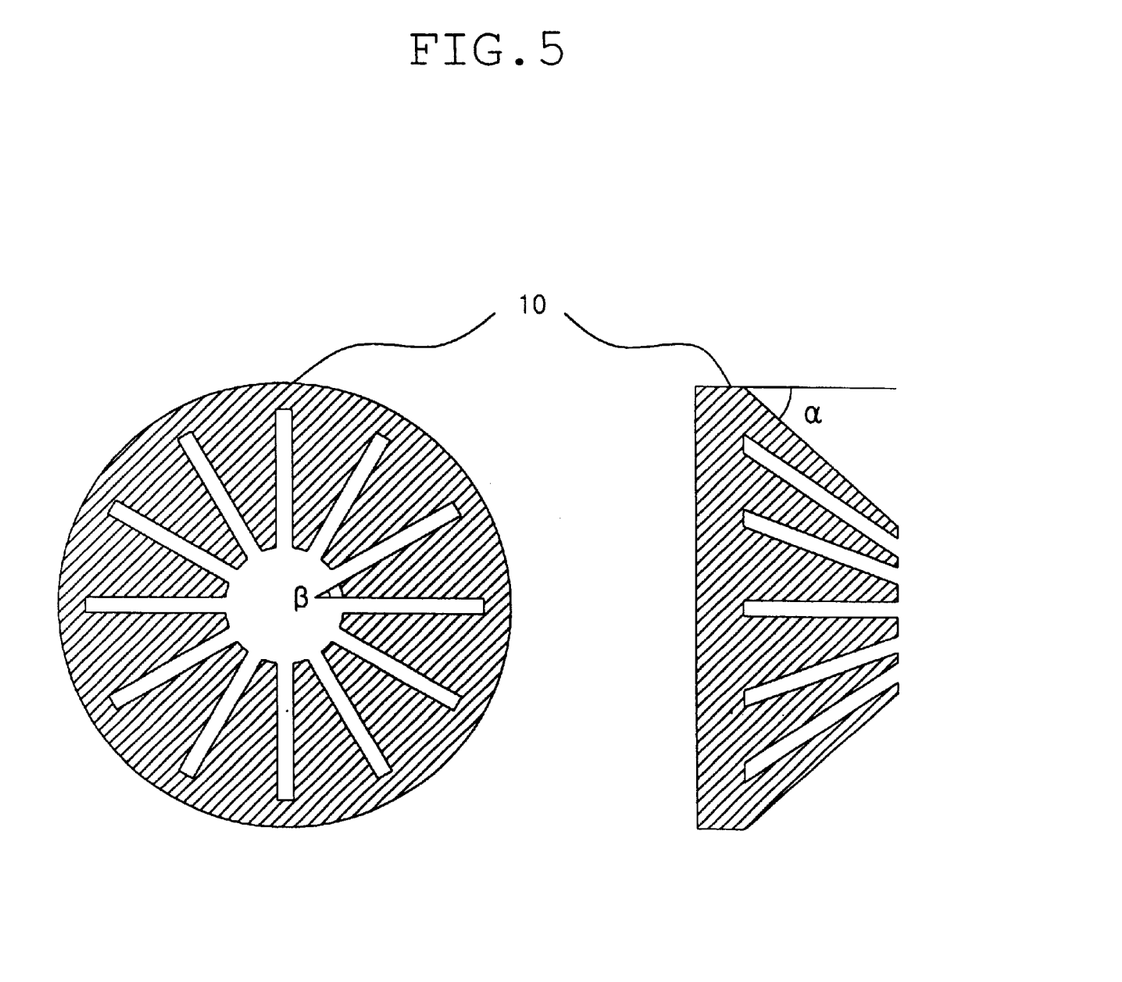
FIG. 5 is a detail view of a secondary mixer in a secondary gas mixing portion composing a hybrid high pressure combustion burner with staged mixing systems employing CST combustion, according to the invention.

FIG. 1 is a schematic view illustrating structural components of a hybrid high pressure CST burner system with staged mixing systems employing catalysts and CST combustion, according to the invention. FIG. 2 is a detail drawing of a primary gas mixing portion, according to the invention. FIG. 3 is a cross-sectional detail view of a catalytic combustion portion and a secondary gas mixing portion composing a hybrid high pressure combustion burner with staged mixing systems employing catalysts and CST combustion, according to the invention. FIG. 4 is an apical cross-sectional view of a honeycomb-typed catalytic reactor composing a hybrid high pressure CST burner system with staged mixing systems employing catalysts and CST combustion, according to the invention. FIG. 5 is a detail view of a secondary mixer in a secondary gas mixing portion composing a hybrid high pressure combustion burner with staged mixing systems employing catalysts and a CST combustion, according to the invention.

As shown in FIGS. 1 to 5, air is first preheated, and the air is mixed with fuel, that is, a primary mixing, in the primary gas mixing portion 1, thereby the gas mixture of the fuel and air is burnt via catalytic combustion. The gas mixture is maintained at a temperature of around 450° C. To maintain the light-off temperature for initiating catalytic reaction, the combustion air 5 is first heated using a gas burner 23 or an electric heater 6, and then the heated air is mixed with the fuel supplied via gas nozzle 7.

At this time, the temperature for heating air is set at around 450° C., which is a little below the temperature for initiating catalytic reaction. The fuel and high temperature air are mixed in a primary mixer 8. The primary mixer 8 may be a swirler generating weak swirling or rotating, or spiral shaped mixer.

A perforated plate 25 is installed at the exit of primary mixer 8 for completing the mixing process.

The gas mixture from the primary mixer 8 passes through a perforated plate 22 for flow control, whereby a gas flowing amount is controlled. As a result, an adequate amount of the primary gas mixture is passed to a catalytic combustion portion 2.

A major part of the primary gas mixture, which is passed through the perforated plate for flow control 22, passes through catalytic layers 9 of metal honeycomb. Another minor part of the primary gas mixture passes through an annular part 14, which is enveloped the honeycomb typed catalytic reactor 9 and an interior cell part of honeycomb without catalysis. The gas mixture passing through the catalytic layer of honeycomb 9 is reacted with active catalytic components, resulting in catalytic combustion. The gas mixture passing through the annular part 14 and null cell of honeycomb are maintained in an unreacted state, since there is no contact with the catalytic components.

The catalytic combustion portion 2 has the catalytic reactor 9 located in the central region. Such a catalytic reactor 9 is supported by a plurality of supporters which are spaced at a certain distance around an outer circumference of the catalytic reactor. In addition, the supporters support the annular part 14.

The outlet of catalytic reactor 9 is connected to a secondary mixer 10, composing a secondary gas mixing portion 3 of catalytic combustion portion 2, located before the burner tile. The secondary mixer 10 is mounted to make contact with a surface of the inner circumference of insulation part 12 of the burner tile. A length of the longitudinal part of the secondary mixer 10 is designed in consideration of ease of manufacturing and mounting, to be half the diameter (D1) of the catalytic reactor 9.

It is preferable that the void distance from the secondary mixer 10 to the burner tile 11 is set less than ³⁄₂ the diameter (D1) of the catalytic reactor 9. The secondary mixer 10 has several vanes produced weak swirling.

In addition, the distance from the catalytic reactor to the swirl vane of the secondary mixer 10, is designed to be half the diameter (D2) of the catalytic reactor 2.

Figure 6A:
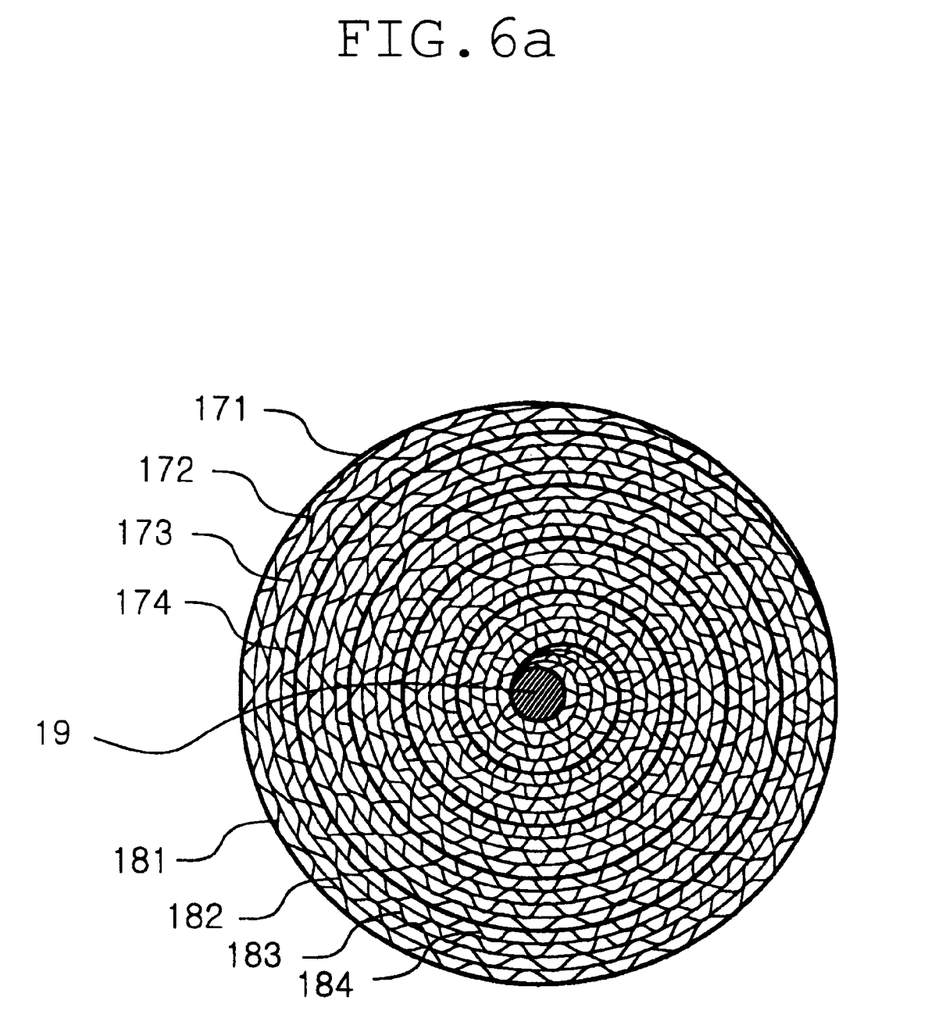
FIGS. 6a and 6b are detail diagrams of a metal catalytic layers composing a hybrid high pressure combustion burner with staged mixing systems employing CST combustion, according to the invention.
Figure 6B:
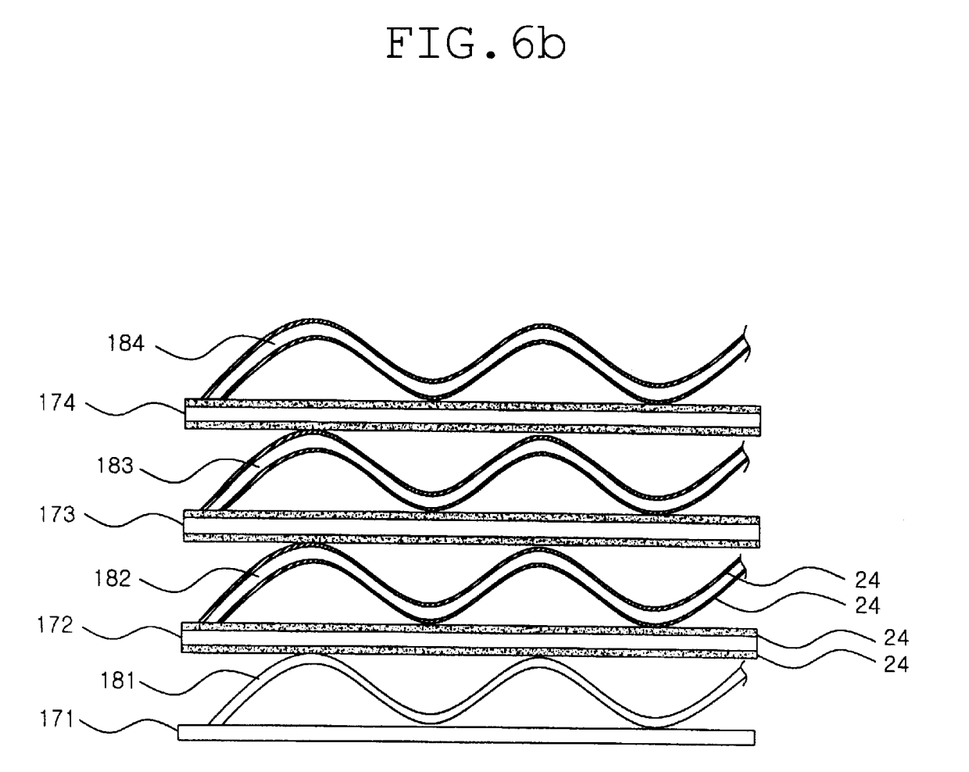

FIGS. 6a and 6b are general drawings of a metal catalytic reactor and catalytic honeycomb layers composing a high pressure catalytic combustion with staged mixing systems employing catalysts and thermal combustion, according to the invention.

The catalytic reactor 9, as shown in FIGS. 6a and 6b, is composed of four thin flat plates 171, 172, 173, and 174 and four corrugated sheets 181, 182, 183, and 184. One layer comprises a flat plate and a corrugated sheet. Four layers thus prepared are wound so as to form a snail-shaped honeycomb structure.

The thin flat plates 24 and corrugated sheets 24 are coated with catalytic materials of one or more of Pd, Zr and Ti on their surface. At this time, all four layers or only three layers may be coated with the catalysts. Where only three layers are coated, only three layers have a catalytic function, forming the catalytic reactor 9. Given that one layer is uncoated with the catalytic material, the uncoated layer forms an inactive catalytic layer, so the primary gas mixture passes through the layer without catalytic reaction. The unreacted gas thus is heated by the exothermic catalytic reaction of the active catalytic layers. As a result, local overheating on the catalytic layers can be prevented by installing this unreacted zone in the reactor 9.

The catalytic reactor 9 is supported by the inner surface of the main frame and the plurality of supporters 15, forming an annular part between an exterior wall of the mainframe and the inner wall of catalytic reactor shell.

The arrangements of such structural components within the catalytic combustion portion 2 are based on the following facts. As catalytic combustion occurs while the primary gas mixture passes through the catalytic reactor 9, heat is generated on the wall of the active catalytic layer. The wall of the active catalytic layer is cooled by unburnt gas mixture passing through the inactive catalytic layer of the catalytic reactor 9 and unburnt gas passing through the annular part 14. As a result, local overheating is prevented.

Further, the catalytic reactor 9 is a multi-layered structure and the multi-layers are wound outward from the core, forming a snail-shaped structure. This is for the reason that as a catalyst body is increased in size, risk of local thermal shock is reduced, thereby minimizing the catalyst body loss caused by catalytic combustion.

The secondary gas mixing portion 3 performs homogenous mixing of the reacted gas produced after catalytic combustion with the unreacted primary gas mixture which is heated via the annular part 14 and the inactive catalytic layer. The gas mixing portion 3 has a function of preventing flashback. Further, the gas mixing vanes can prevent the direct damage of thermal radiation from a high temperature CST combustion zone toward the catalyst body. The secondary gas mixing portion includes a secondary mixer 10 with a corrugated structure mounted therein.

It is preferable that the secondary mixer 10 functions to thoroughly mix the primary gas mixture with the high temperature catalytic combustion gas, while the axial angle α of the vane should be 30 to 70° and a swirl angle β of the vane should be 30 to 70°, so as not to generate a recirculation zone in its wake in the secondary mixer.

The bent secondary mixer 10 performs secondary mixing of the high temperature gas after catalytic combustion and the primary gas mixture of fuel/air. Such secondary mixer is designed to ensure that the swirl intensity is at a medium or weak level, and a swirl number of 0.3 to 0.6 is maintained. The swirl angle of the vane is thus designed for complete mixing, preventing gas flow with incomplete mixing caused by weak swirling, and gas flow with recirculation caused by strong swirling. If the swirl angle of the vane is less than 30°, the swirl number is 0.3 or less, failing to provide complete mixing. On the other hand, if the swirl angle of the vane is 70° or more, the swirl intensity is high, generating an internal recirculation flow, thereby cause to promoting flashback.

The secondary mixer is designed to ensure that a vane length should be set so as to prevent heat damage applied to the metal catalytic reactor, due to radiation of high temperature generated in the combustion chamber, and also to prevent flashback.

Especially, it should be noted that after gas mixing, a linear velocity of gas flow at the vane outlet is designed to be greater than CST combustion speed, thereby preventing a flashback.

The CST combustion portion 4 is a combustion zone where the secondary gas mixture is burnt via CST combustion. This combustion portion has a horn-shaped burner tile where complete combustion is mainly achieved while maintaining stable CST combustion, constraining $NO_x$ formation. The spreading angle γ of the horn-shaped burner tile is preferably 10 to 45°.

Too wide a spreading angle causes recirculation flow in the center and at the wall of the burner tile. As a result, though stable CST combustion is formed, $NO_x$ is generated due to a too high temperature, and external recirculation flow is formed around the wall of the burner tile. For these reasons, the spreading angle of the burner tile is limited to preferably 10 to 45°.

As apparent from the above description, the present invention provides a hybrid high pressure catalytic combustion burner with staged mixing systems employing catalysts and CST combustion, offering the following benefits.

First, employing hybrid combustion using catalysts and CST combustion with staged mixing systems of fuel and air, the maximum temperature for CST combustion can be maintained below the temperature where little thermal $NO_x$ is formed. Also, local overheating or gas concentration gradient in the CST combustion zone can be reduced, thereby maintaining conditions for little overall $NO_x$ formation.

Figure 7A:
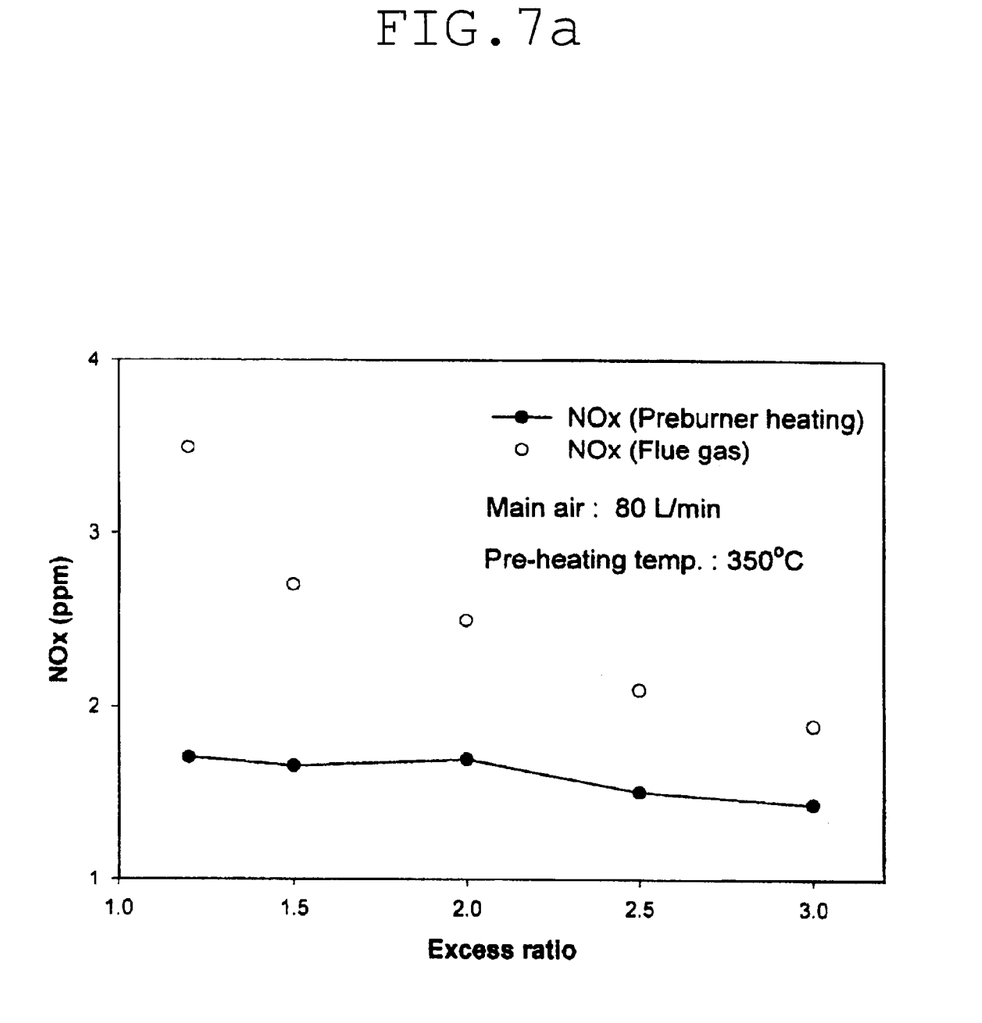
FIG. 7a is a graph showing NOx emissions in a CST combustion where the combustion air is preheated by a gas burner.
Figure 7B:
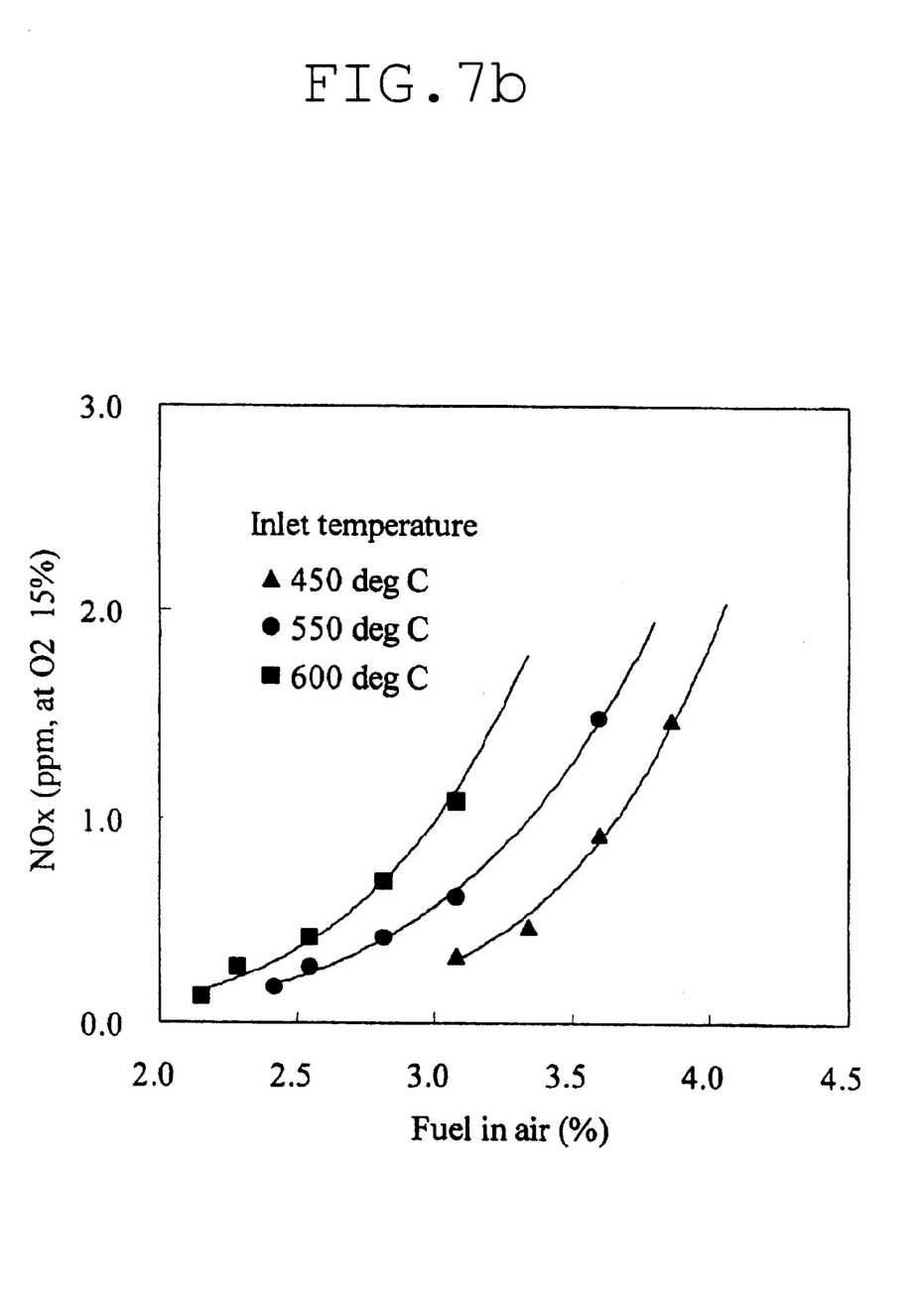
FIG. 7b is a graph showing NO emissions upon atmospheric pressure combustion in a catalytic combustor.

As shown in FIG. 7a, during the CST combustion process where air is preheated by using the gas burner to initiate a catalytic combustion reaction, thermal $NO_x$ was formed at an amount of about 2 ppm, a similar level to that measured at the outlet of the catalytic combustion zone. The amount of $NO_x$ measured at the outlet of the combustion chamber was about 3 ppm, and little $NO_x$ was generated during the actual catalytic combustion. On the other hand, as shown in FIG. 7b, the amounts of $NO_x$ generated in the catalytic combustor varied according to air-preheating temperatures and fuel % in air. In other words, when a preheating temperature of the mixer is raised under a certain fuel % in air, an adiabatic CST combustion temperature is increased, and the amount of $NO_x$ generated is proportionally increased. In addition, as the fuel % in air is increased, the adiabatic CST combustion temperature of the combustion gas is greatly increased, leading to an exponential increase in formation of $NO_x$. Therefore, it can be found that the combustors should be operated under an optimal condition.

Figure 8:
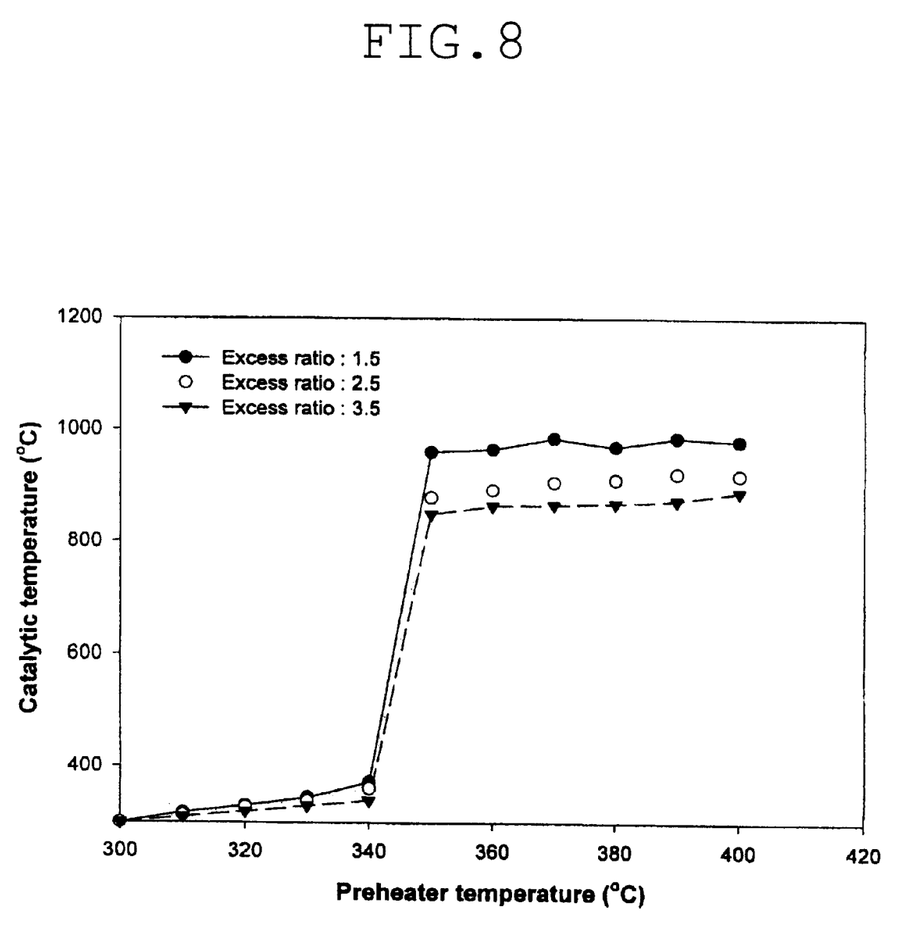
FIG. 8 is a graph showing of light-off temperature of catalytic reaction and overall combustion properties according to preheating temperature.

Second, it is known that the temperature for initiating a catalytic reaction is different according to catalyst materials and catalyst-embedding techniques. Using Pd/Zr catalysts prepared by the inventors, complete combustion for methane was achieved. As shown in FIG. 8, the catalytic reaction temperatures were maintained at about 340° C., regardless of excess air ratios. However, the temperatures varied in the rear of the catalytic combustion chamber, according to excess air ratios, and remained at more than 800° C., which is the temperature required to maintain CST combustion.

Figure 9:
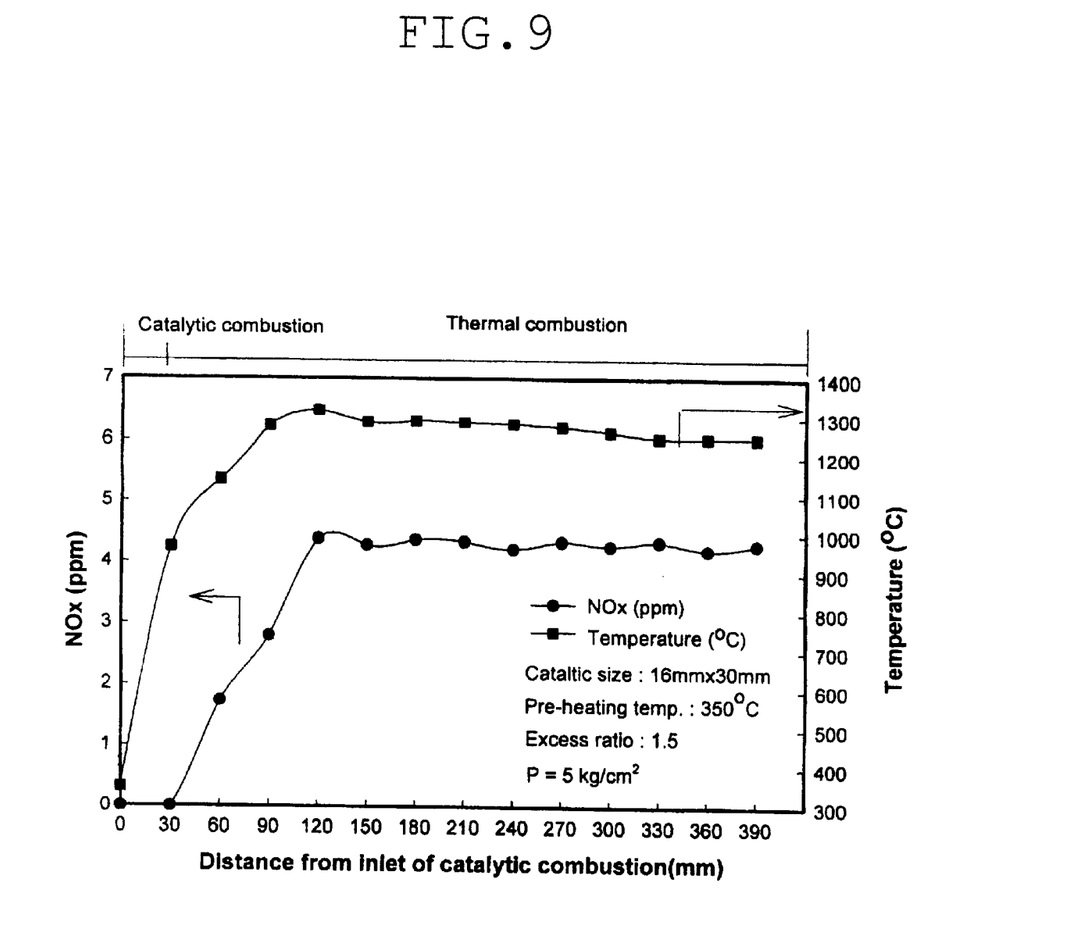
FIG. 9 is a graph showing NOx formations and temperature variations according to the axial distance from the tip of catalytic exit in a hybrid high pressure catalytic combustor equipped with burner tiles having a spreading angle of 45°, with preheat systems and with CST combustion having no secondary mixer.

Therefore, catalytic combustion produces less $NO_x$ emissions. However, degree of $NO_x$ emissions can be significantly determined by secondary mixing and CST combustion processes. That is, the secondary mixing process and the burner tile design according to the invention offers advantages for reducing $NO_x$ emissions. FIG. 9 shows measurements of $NO_x$ emissions upon operating a combustor which has no secondary mixer and has a burner tile with a spreading angle of 45°. The temperature of combustion gas was maintained at around 1000° C. from the rear of catalytic bed to a point 30 mm center line of the combustor, where CST combustion occurred. Little $NO_x$ formation was seen in that region. On the other hand, the region from a point 60 mm to a point 120 mm center line of the combustor, where a secondary gas mixing might be achieved in the combustor according to the invention, showed a sharp increase in the temperature of the combustor, with a peak of 1320° C. In addition, the amount of $NO_x$ measured was about 4 ppm. These results indicate incomplete gas mixing. Further, the reason is that the local temperature was greatly increased due to local combustion caused by external recirculation occurring in the burner tile. Thus, it can be inferred that the secondary mixer and an angle design of the burner tile are important for controlling $NO_x$ emissions.

Figure 10:
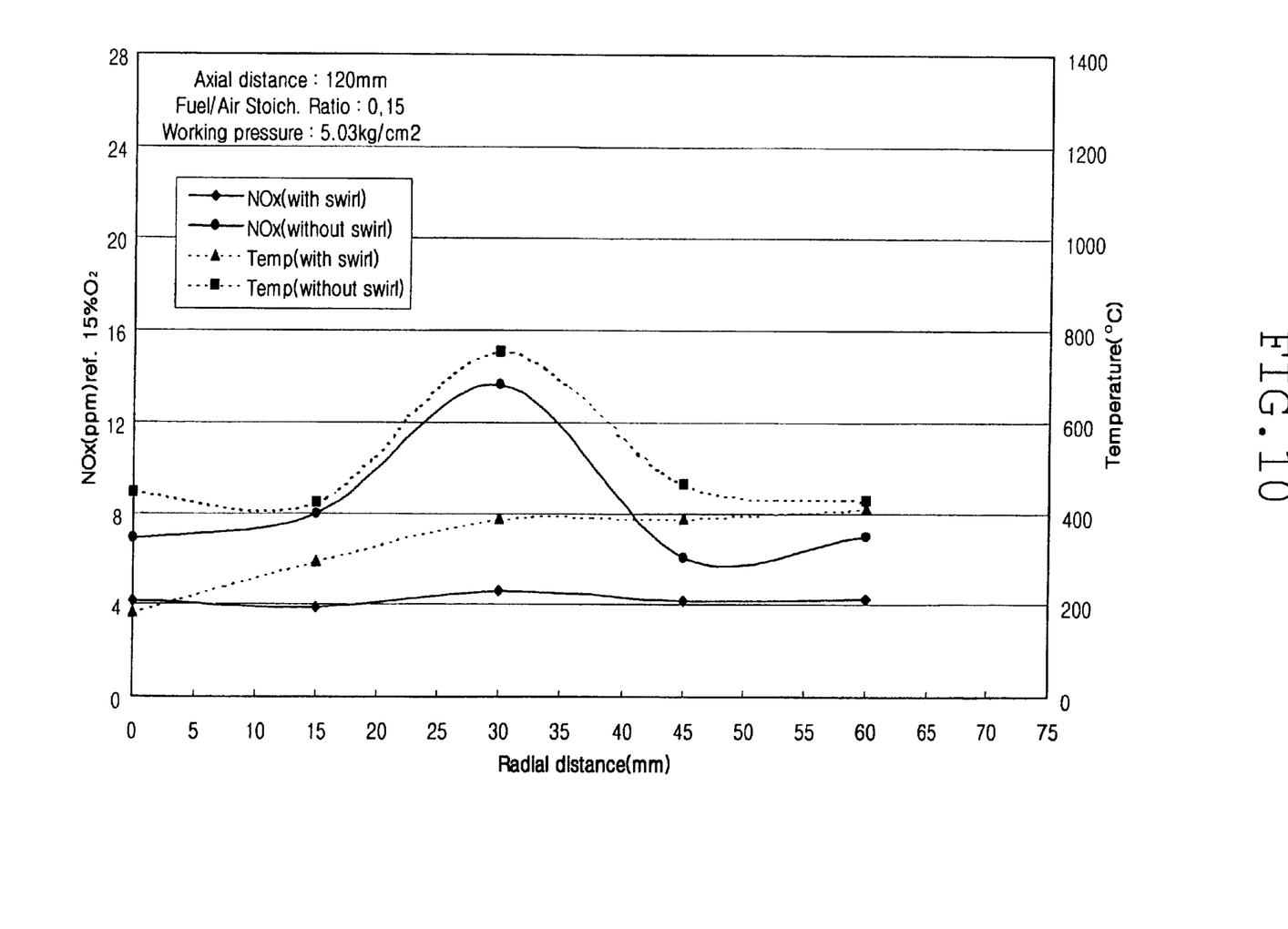
FIG. 10 is a graph showing NOx formations in a hybrid high pressure catalytic combustor having been equipped with a secondary mixer having a swirl angle of 30° and having no secondary mixer.

Also, FIG. 10 is a graph showing $NO_x$ formations in a hybrid high pressure catalytic combustor having been equipped with a secondary mixer having a swirl angle of 30° and having no secondary mixer. In case of having no secondary mixer, due to a sharp spreading angle of the burner tiles, local overheating in the CST combustion zone was occurred, thereby the concentration of $NO_x$ was locally increased to an average of 8.2 ppm. Whereas, in case of having a secondary mixer, the overall temperature and the concentration of $NO_x$ were relatively uniform, and the average concentration of $NO_x$ was lowly maintained to 4.4 ppm.

Consequently, according to the invention, it is possible to develop a high temperature/high pressure catalytic combustor with little $NO_x$ emissions (less than 3 ppm). Accordingly, cogeneration systems which are operated at low cost and offer comfortable conditions can be applied in large apartment complexes. Further, such combustors are applicable to hybrid gas turbine engines for use in automobiles, providing high efficiency and little pollution, and other small thermal load systems, and large-scaled cogeneration gas turbines.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A hybrid high pressure catalytic combustion burner with staged mixing systems employing catalysts and CST combustion, comprising:

a primary gas mixing portion for homogenous mixing of preheated air with fuel;

a catalytic combustion portion for combusting the gas mixture prepared in the primary gas mixing portion via surface reaction;

a secondary gas mixing portion for mixing of reacted gas via surface reaction in the catalytic combustion portion with unreacted gas which is not subject to surface reaction; and a CST combustion portion for burning the gas mixture prepared in the secondary gas mixing portion.

2. The hybrid high pressure catalytic combustion burner with staged mixing systems employing catalysts and CST combustion as set forth in claim 1, wherein the primary gas mixing portion includes a gas burner or an electric heater for preheating air supplied from a nozzle, a fuel injection nozzle for injecting a fuel, a primary mixer for homogenous mixing of the preheated air with the fuel, and a honeycomb plate for regulating the flow of the mixed gas.

3. The hybrid high pressure catalytic combustion burner with staged mixing systems employing catalysts and CST combustion as set forth in claim 2, wherein the primary mixer is a swirler or a linear type mixer.

4. The hybrid high pressure catalytic combustion burner with staged mixing systems employing catalysts and CST combustion as set forth in claim 1, wherein the catalytic combustion portion includes:

- a catalytic bed which is composed of 4 layers, each layer comprising a flat plate and a corrugated sheet, the flat plate and the corrugated sheet being coated with catalysts, and the 4 layers being wound to form a snail-shaped structure;
- a plurality of supporters for supporting the catalytic reactor; and
- an annular part being supported by the supporters.

5. The hybrid high pressure catalytic combustion burner with staged mixing systems employing catalysts and CST combustion as set forth in claim 4, wherein the catalytic bed has one layer composed of a sheet uncoated with catalysts on the surface.

6. The hybrid high pressure catalytic combustion burner with staged mixing systems employing catalysts and CST combustion as set forth in claim 1, wherein the secondary gas mixing portion is mounted with a secondary mixer of a bent structure.

7. The hybrid high pressure catalytic combustion burner with staged mixing systems employing catalysts and CST combustion as set forth in claim 6, wherein the secondary mixer has an axial angle of a vane and a swirl angle $\beta$ of the vane of 30 to 70°, respectively.

8. The hybrid high pressure catalytic combustion burner with staged mixing systems employing catalysts and CST combustion as set forth in claim 1, wherein the CST combustion portion includes a burner tile of horn-shaped combustion chamber.

9. The hybrid high pressure catalytic combustion burner with staged mixing systems employing catalysts and CST combustion as set forth in claim 8, wherein the combustion chamber has a spreading angle of 10 to 45°.

* * * * *